Dec. 12, 1950  J. I. YELLOTT  2,533,866
GENERATING ELECTRIC LOCOMOTIVE WITH
COAL FIRED GAS TURBINE
Original Filed Aug. 17, 1946  3 Sheets-Sheet 1
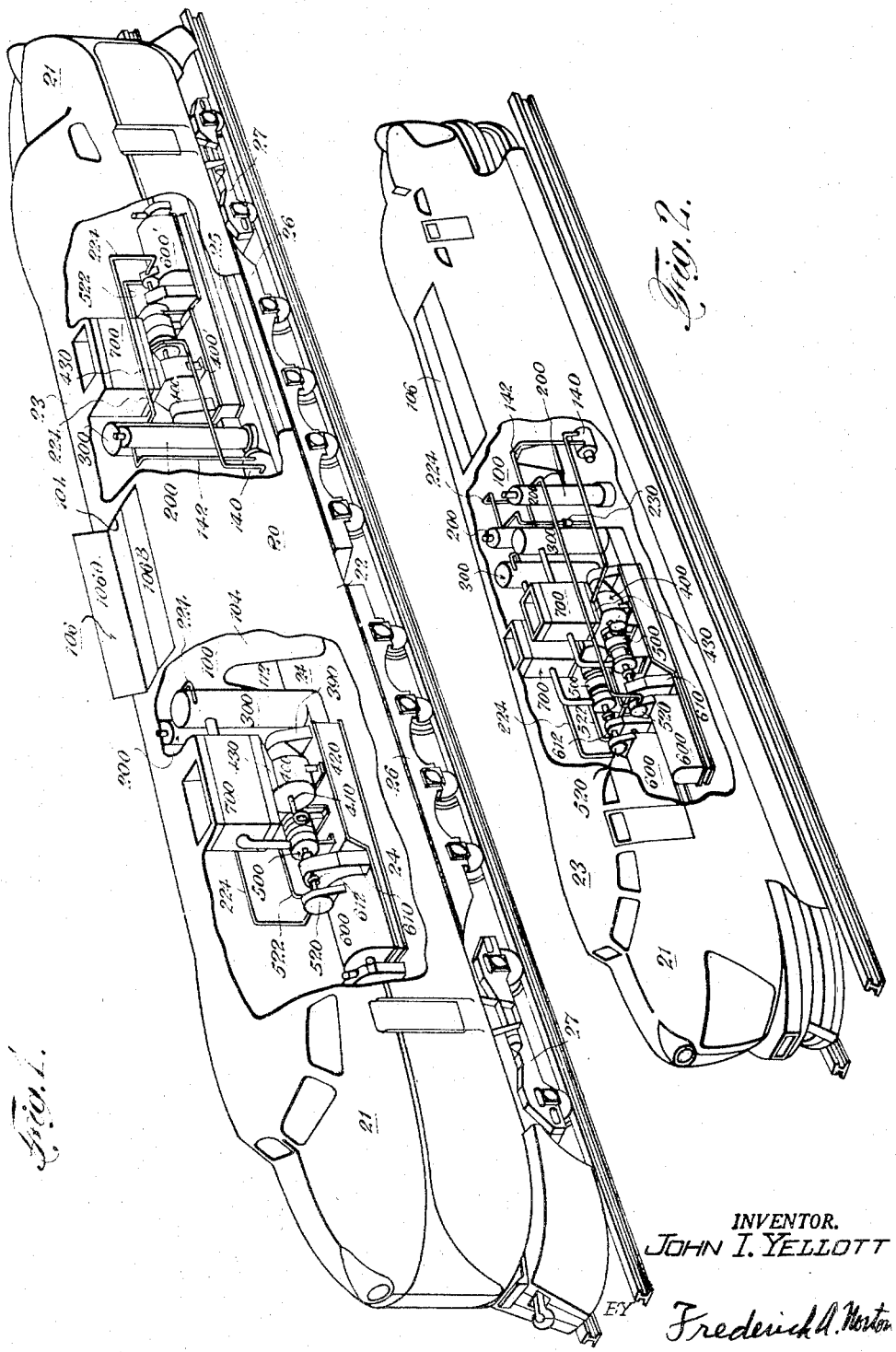
INVENTOR.
JOHN I. YELLOTT
BY Frederick A. Norton
ATTORNEY Dec. 12, 1950   J. I. YELLOTT   2,533,866
GENERATING ELECTRIC LOCOMOTIVE WITH
COAL FIRED GAS TURBINE
Original Filed Aug. 17, 1946   3 Sheets-Sheet 2
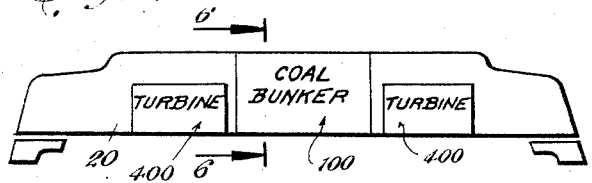
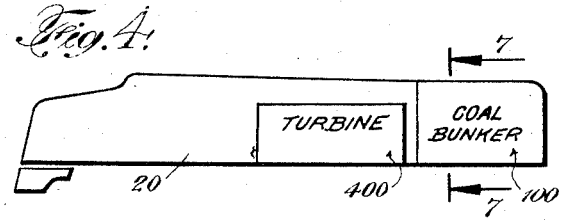
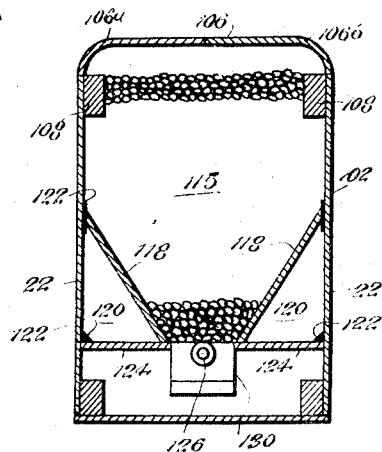
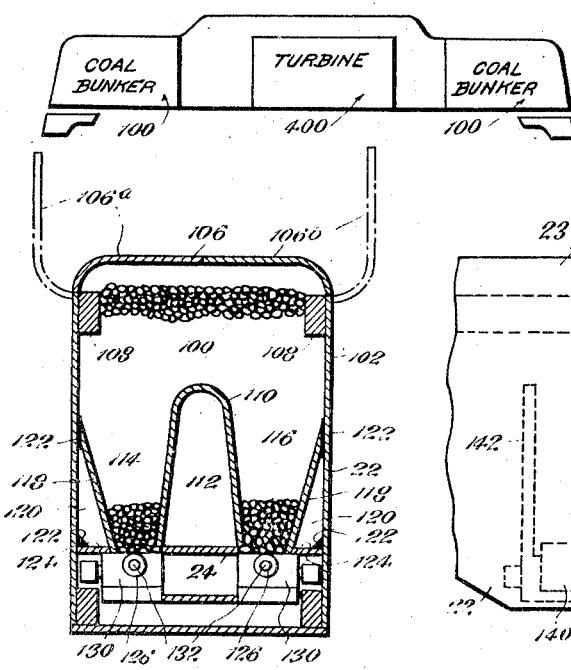
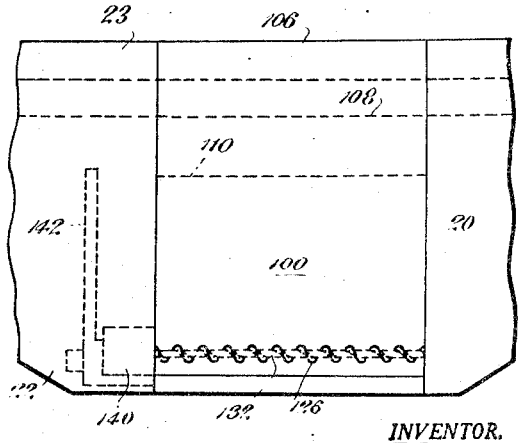
INVENTOR.
JOHN I. YELLOTT
BY
Frederick A. Norton
ATTORNEY Dec. 12, 1950   J. I. YELLOTT   2,533,866
GENERATING ELECTRIC LOCOMOTIVE WITH
COAL FIRED GAS TURBINE
Original Filed Aug. 17, 1946   3 Sheets-Sheet 3

INVENTOR
JOHN I. YELLOTT
BY
Frederick A. Norton
ATTORNEY

Patented Dec. 12, 1950

2,533,866

UNITED STATES PATENT OFFICE 2,533,866

GENERATING ELECTRIC LOCOMOTIVE WITH COAL-FIRED GAS TURBINE

John I. Yellott, Cockeysville, Md., assignor to Bituminous Coal Research, Inc., Washington, D. C., a corporation of Delaware Original application August 17, 1946, Serial No. 691,307. Divided and this application May 13, 1948, Serial No. 26,744

12 Claims. (Cl. 105—36)

This invention relates to improvements in self-powered, generating electric locomotives, and more particularly to electric locomotives in which the generators are powered by coal-fired gas-turbines incorporated in and forming an integral part of the locomotive equipment and including coal bunkers, mechanical and pneumatic coal carrying equipment, and special pressure combustors for supplying motive fluid for the gas-turbines. This application is a division of my application Serial No. 691,307, filed August 17, 1946, for Coal-Fired Gas Turbine Power Plants.

Hitherto, the reciprocating steam engine has been used by railroads as the standard motive equipment. However, the "steamer," while effective, is a relatively inefficient machine, as only 4% to 8% of the energy generated by burning coal in the fire box is transmitted to the wheels of the locomotive. Diesel locomotives, while characterized by a thermal efficiency of 22% to 24%, require special fuel and lubricating oil supplies and equipment, and require close mechanical supervision. In addition, the operative range of the Diesel locomotive is severely restricted by virtue of the fact that special supplies and supply depots must be set up and maintained, with a consequent maximum of operative and maintenance costs.

It has now been found that generating electric locomotives can be economically and effectively utilized with operating costs lower than those obtainable with Diesel power, by incorporating coal burning-gas turbine motive units in such locomotives for the electric generators which generate the power for energizing the driving motors.

Among the features of novelty and advantage of the present invention are generating electric locomotives incorporating coal-fired, gas-turbine power plants for the generators, in which the coal is carried, on the locomotives, in special bunkers for delivery, in a combustive air stream, to combustors provided with coal pulverizers, after treatment in crushing or pulverizing equipment. The powdered coal is handled and burned in a closed pressure system, the products of combustion being delivered to high-speed gas turbines coupled to electrical generators which supply power to the driving motors of the locomotives.

Special features of novelty and advantage include equipment for fly ash removal and elimination of soot, cinders, and like products of combustion.

Another feature of novelty and advantage of the invention herein resides in a special coal burning power plant having a low operating cost; using no water; and having relatively few moving parts to maintain.

The gas turbine-powered, generating electric locomotive is characterized by further advantages in that the weight of the equipment is less than one-half of steam equipment of the same operative capacities, and considerably under that of Diesel-electric equipment.

Flowing from these primary considerations, the new coal burning-gas turbine, generating electric locomotive will be characterized by a great reduction in rail pounding due to the absence of reciprocating parts, with the result that smoother operation will obtain and there will be a lower cost of maintaining rails and road beds.

Further advantages flow from the fact that, in contra-distinction to conditions obtaining with the operation of "steamers," the gas turbine-powered, generating electric locomotive will produce substantially half again as much power in winter as it produces in summer without added equipment or operative features.

Additional features of novelty and advantage reside in the special fuel-handling and power-generating equipment, of reduced size and weight, with a maximum delivery of power generated, and including maintenance of train heating services, without requiring special equipment, or the burning of additional fuel, as is now the case.

These and other desirable features of novelty and advantage of the present invention will be described in the accompanying specification, certain preferred forms of equipment being illustrated in the drawings, by way of example only, for, since the underlying principles may be incorporated in other power-generating equipment, it is not intended to be limited to the forms here shown, except as such limitations are clearly imposed by the appended claims.

In the drawings, like numerals refer to similar parts throughout the several views, of which Fig. 1 is a perspective view of an aligned twin-turbine, coal-burning, generating electric locomotive, with parts broken away to show the power units;

Fig. 2 is a view similar to Fig. 1, showing a tandem arrangement of the twin turbines;

Figs. 3, 4 and 5 are schematic diagrams showing coal bunker arrangements;

Fig. 6 is a vertical cross section of a double-hopper bunker, taken on line 6—6 of Fig. 3;

Fig. 7 is a vertical cross-section of a single hopper bunker, taken on line 7—7 of Fig. 4;

Fig. 8 is a side view of the bunker of Fig. 6, and

Figure 9:
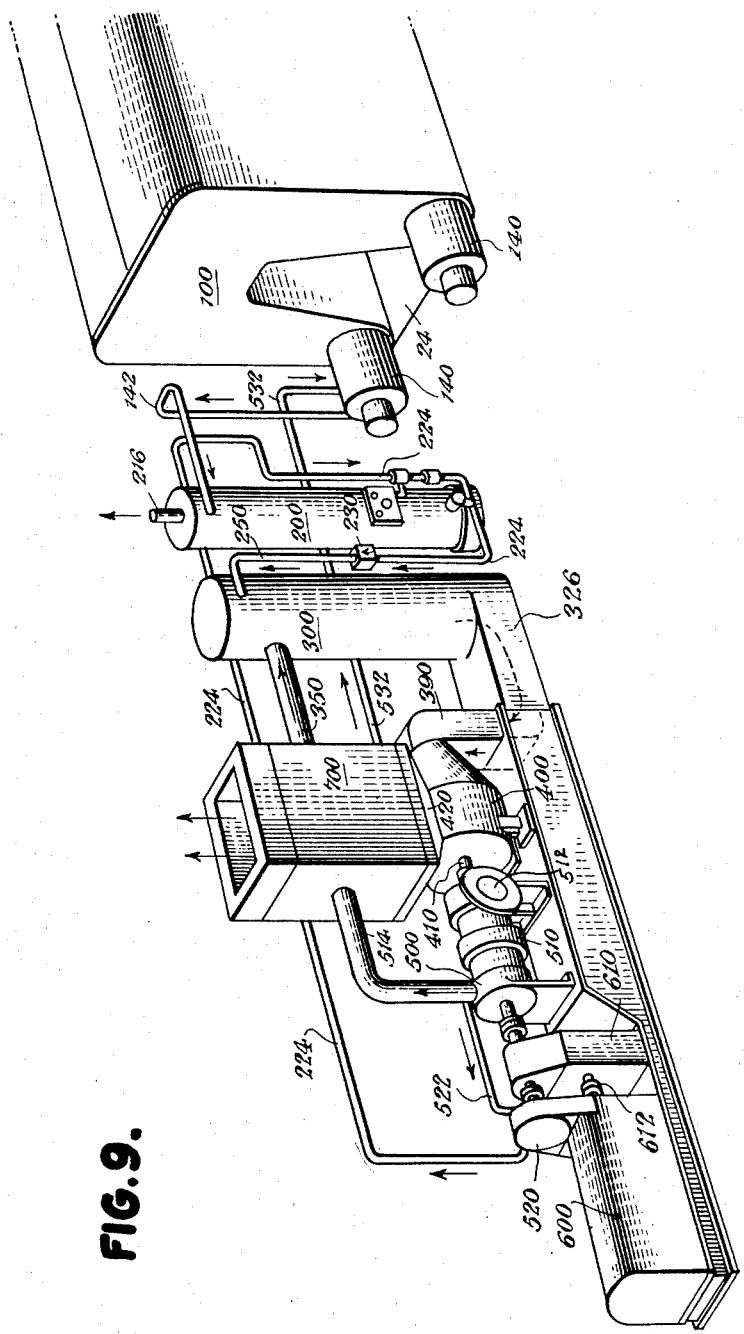
Fig. 9 is a perspective view, in enlarged detail, of one of the power units shown in Fig. 1.

Referring more particularly to the drawings, there is shown in Fig. 1 a double-ended locomotive 20, having cabs 21 at either end, side walls 22, continuous dome roof 23, and a flooring 24, supported on a main frame 25, which is supported at either end by bogies 26. Trucks 27 are mounted beneath the cabs. The general structural features of the locomotive frame and housing of the invention herein, are illustrated to show the cooperative assembly of the novel motive units herein, comprising electric generators, powered by coal burning-gas turbines, and their auxiliary equipment.

In the form shown in Fig. 1 the power units are aligned along the central longitudinal axis of the locomotive and are severally positioned at either end of the central coal bunker, providing separate motive units for the two ends of the locomotive, which is provided with duplicate control cabs. In the form shown in Fig. 2 the coal bunker is abutted against the cab at one end of the locomotive and the power units arranged in spaced parallel alignment on either side of the central longitudinal axis of the locomotive. In both of these arrangements there is an absolutely even distribution of the dead weight of the equipment, and the special bunker construction insures that the coal load is likewise uniformly distributed at all times, no matter what its diminishing bulk.

The equipment illustrated in Figs. 1 and 2, comprises a pair of power units fed by a divided coal bunker 100 (Figs. 1 and 2). Each power unit includes a pressure tank 200 for receiving crushed fuel, combustor 300, gas turbine 400, air-compressor system 500, generator 600, and regenerator 700.

In the operation of a power system according to the present invention, coal is fed from bunker 100, through a suitable mill or grinder 140, to pressure hoppers 200, from which it is delivered, under pressure, to the combustor 300. The gaseous products of combustion are delivered from the combustor to the gas-turbine 400, the fly ash being separated en route. The gaseous products of combustion are discharged from the turbine and vented to the atmosphere through exhaust stack 700 housing a regenerator, not shown. The turbine and the compressors, severally designated generally by numerals 400 and 500, are mounted on a common shaft which is coupled to a generator 600 in any suitable manner. The generator delivers current to the driving motors, through the usual control equipment, the details of which are not shown as, of themselves, they form no part of the present invention. The equipment is essentially controlled from the cab by suitable throttle means controlling the feed of the pulverized fuel, under pressure, to the combustor. Because of the operative characteristics of the gas-turbine, the power developed can be readily controlled by controlling the fuel input, and, consequently, controlling the speed developed.

The turbine embodies a horizontal driving shaft 410, and is mounted on a suitable base 420, which also serves as a base for mounting the air compressors and generator. The air compressors and generator are in alignment with the turbine, the compressors being mounted on the same shaft and driven thereby. A reduction gear 610 is connected through coupling 612 to generator 600, which may comprise any specific or desired number of units. As contemplated herein, four 1,000 H. P. generators will deliver about 4,000 electrical H. P. with less than 1 lb. of coal per H. P. hour.

The regenerator 700 is mounted on the turbine casing and connected therewith by means of an exhaust stack 430.

The specific details of the gas turbine in combination with the fuel supply and handling equipment, and the details of the mounting of the regenerator, are shown and claimed in my parent application. Modified forms of such equipment are shown and claimed in other divisions of my said parent application, viz. Serial No. 764,429, filed July 29, 1947, for "Combustors"; and Serial No. 763,850, filed July 26, 1947, for "Coal-Fired Gas Turbine."

It is to be noted that the units of the power plant, in their cooperative assembly, are longitudinally and symmetrically aligned along the central axis of the locomotive, with all static load or equipment parts being mounted over the bogies, or main truck frames, while the bunker, accounting for the varying load of the system, in one form shown herein, is preferably centrally disposed between the power units. With a bifurcate hopper arrangement of the coal bunker, as shown in Figs. 1, 2 and 6, where the hoppers are parallel and symmetrically disposed with respect to the longitudinal axis of the locomotive, the shifting or diminishing coal load is always uniformly applied at both sides of the frame so as to give a true balanced load at all times and under all conditions of operation. In the bunker form shown in Fig. 7, the same condition obtains. Because of the preferred center location of the coal bunker, any reduction in tractive effort, consequent upon diminishing coal loads, is minimized.

Some of the arrangements of the bunkers possible under the system herein are indicated schematically in Figs. 3 to 5. Thus, in Fig. 3, there is shown a power system comprising two aligned turbines mounted on opposite ends of a central coal bunker. In Fig. 4, the system comprises a single turbine with a coal bunker carried aft; while in Fig. 5, there is shown a single turbine unit with coal bunkers fore and aft.

The form of the bunker 100, shown in Fig. 6, comprises a closed compartment having side walls 102 coextensive with, or formed as a part of, the side walls 22 of the locomotive, together with end walls 104, and a closure 106. The closure 106 will be flush with the roof 23 of the locomotive, and is comprised of a pair of doors 106A, 106B mounted on side framing members 108 and controlled by suitable mechanism from the control cab. The doors or covers 106A, 106B, are fitted, in mating fit, so as to afford a substantially hermetic seal or cover for the bunker. The bunker is divided, on a central longitudinal axis, by an arched passageway or U-shaped sheet 110, defining a passageway 112 with the floor 24. The arch 110 divides the bunker longitudinally into two symmetrical hoppers 114, 116. The outer walls of the hoppers are formed by plates 118 set at an angle of 26° or more to form compartments 120 with the side walls 22 of the locomotive. Plates 118 are secured to the cooperating sheets in any suitable manner, as by welding, indicated generally at 122, to form hermetic seals. With this construction, the compartments 120 will serve as water compartments to provide the necessary water for heating the train and for lavatory services. A great saving of weight and space is effected in the present system because of the fact that no separate water tenders are needed for supplying water for power purposes.

In the single hopper bunker shown in Fig. 7, a single tapering hopper 115 is formed by the usual slanting side elements 118, and this hopper feeds the usual screw feed 126. The construction elements of this type of hopper are substantially the same as those illustrated in Fig. 6, for the double hopper bunker, and they will not be described any more in detail.

The bottoms of the side compartments 120 are preferably formed by separate plates 124. The bottoms of the hoppers 114, 116 are formed as troughs 130, and suitable feed plates may be used to separate the troughs from the hopper proper.

Each hopper is provided with a trough 130 fed by bunker feeders comprising screws 126 mounted on shafts 132 which are coupled to air motors, not shown. The screws 126 deliver the coal from the hoppers into combination crushers and dryers, designated generally by the numeral 140 (Figs. 1, 2, 8 and 9). The crushed and dried fuel is conveyed by a pneumatic conveyor 142 to a pressure hopper or hoppers, designated generally by the numeral 200. Pressure hoppers may be used singly or in tandem, and the preferred construction of these elements is more particularly described and claimed in the parent application, above identified.

The hoppers 200 discharge crushed coal through any suitable delivery means into high-pressure air line 224, which transports the coal, as a fluidized streaming entrainment of solid particles, to the combustor 300, after passing through pneumatic pulverizer 230. The high pressure line is desirably operated at 150 p. s. i. (standard air brake pressure) by air delivered from air pump 520, which receives its air supply through line 522, from the discharge side of the main, low-pressure compressor 500. As shown more in detail in Fig. 9, the power plant units of the present invention include a closed bunker 100, an air motor driven crusher 140, a crushed coal storage tank 200, a combustor 300, turbine 400, a first air compressor 500, a second, higher pressure, air pump 520, a regenerator 700 mounted in the turbine exhaust stack 420, and a generator 600 coupled to and driven by the turbine shaft 410 through gear box 610 and shaft 612.

The crushed coal from crusher 140 is air-borne through line 142 and discharges into the upper, cyclone separator section of tank 200 into which the crushed coal is discharged, the hot, carrying air being vented through vent 216. The hot, carrier fluid for line 142, is aspirated from the turbine exhaust stack through line 532, and crusher 140, by a suction fan in the separator section of tank 200. Crushed coal is fed into high pressure, combustive air line 224, and the air-borne coal is pulverized by passage through the pneumatic pulverizer 230, which is desirably of the convergent nozzle type. The resulting air-borne streaming entrainment of fluidized, pulverulent solid particles is discharged through line 250 to the combustor 300. In the combustor the fuel is burned under pressure, and the products of combustion, mixed with low pressure, preheated air from line 350, combine to form an ash-bearing motive fluid which is discharged through ash-separators mounted in duct 326, the cleaned gas being delivered to turbine 400 through feeder duct 390, and, after expansion in the turbine to atmospheric pressure, exhausts to the atmosphere through turbine exhaust stack 420 and regenerator casing 700.

The main compressor 500, is mounted on the frame with the turbine and the generator. This compressor is of the axial type with a casing 510, muffled air intake 512, and compressed air discharge line 514 connected to preheated air line 350 in regenerator 700. The second, high pressure air pump 520 is mounted on the generator 600, and driven from gear box 610. Input line 522 connects this pump with discharge line 514 of compressor 500. The second pump discharges high pressure, combustive air through line 224 to the crushed coal tank 200, and pneumatic pulverizer 230.

The specific details of the fuel treating, pulverizing and pressurized delivery, as a streaming entrainment of fluidized particles, are described and claimed in my parent application, and in the companion divisional application, Serial No. 763,850, filed July 26, 1947, for Coal-Fired Gas Turbine.

The combustors 300, and their structure and mode of operation are more particularly shown and claimed in my application, Serial No. 764,429, filed July 29, 1947, for Combustors, as a division of the above recited parent application Serial No. 691,307, filed August 17, 1946, of which this application is also a true division.

For gas turbine service the coal must be under pressure in order to enter the combustion chamber. I have determined that an excess pressure of some 80 lbs. air must be maintained on the upstream side to give satisfactory pulverization. Tests with a flash pulverizer show that there are certain peculiar properties of a convergent-divergent nozzle which are of distinct advantage in the system herein. Using a nozzle which is so constructed that the angle between divergent sides can be varied continuously over a wide range, I have found that, if the angle is adjusted properly, for a given set of conditions, the pressure of air flowing through the nozzle can be made to fall almost to atmospheric pressure, and then to rise again, to approximate the pressure obtaining in the combustion chamber. The specific details of the pressurized combustion and the equipment therefor are shown and claimed in my application Serial No. 764,429, above referred to.

It is well known that in the operation of gas turbines the power developed varies directly as the quantity of fuel fed to the combustor. By varying the quantity of fuel supplied to the combustor, the speed of the turbine is directly controlled, and without any appreciable lag, so that true throttle control, characteristic of gasoline engines, can be said to obtain. In the present system, this desirable throttle control can be secured by varying the solid fuel feed to the combustor. The details of the throttle control are described and claimed in application Serial No. 764,429, above identified.

The special arrangement of the motive equipment herein, including turbo-electric generators for supplying power for the driving motors, is characterized by the incorporation of a coal-burning combustor in combination with an auxiliary high pressure air pump for supplying combustion air to the combustor, a main compressor for supplying air to cool the combustion gases and combine therewith to form the motive fluid for the turbine. The special arrangement of the motive gas-generating equipment does not interfere with the substantially conventionalized turbo-generator equipment, even while incorporating coal-handling equipment, including bunkers for run-of-mine locomotive coal, crushers for reducing the lump coal to uniform particle size while simultaneously drying and delivering to storage hoppers, as well as novel arrangements of pressurized pneumatic pulverizers through which crushed coal is carried in high pressure air streams, and delivered, as air-borne powder to pressure combustors to provide motive fluid for the gas turbines. The system herein also includes the enhancement of the turbine operation in terms of draw-bar pull, or effective traction load of the locomotive, by including regenerators for the diluent compressed air used to modify the high temperature combustion gases down to an operative motive fluid having an appreciably lower temperature.

It will also be appreciated that there has been provided novel generating electric locomotives, in which the generators are driven by gas turbines powered with motive fluid derived from compressed air heated to the optimum turbine operating temperature by the products of combustion resulting from the pressurized combustion of air-borne pulverized solid fuel and including pressurized combustion systems for utilizing pulverized solid fuels in which the products of combustion of the system are modified, and then fed, as motive fluid, into a gas turbine, mounted on a common shaft with a main compressor, and coupled to a generator or mechanical power translating mechanism. The necessary compressed air for maintaining the pressure combustion system with a pressure drop of the order of 80 p. s. i. between the feed to the combustor and the combustor chamber is supplied by an auxiliary compressor. The waste heat from the regenerator is used in a pressure fluid stream to transport and drive the raw fuel from a bunker, through a breaker or comminutor, to a comminuted fuel-storage chamber, where it is de-aerated, and from whence it is transported, in a separate stream of high-pressure compressed air delivered by an auxiliary compressor, to the combustor feeding the gas turbine. The system herein has been shown to be particularly adapted for generating electric locomotive use, and the special assemblage of cooperating parts has been shown to have novel and desirable characteristics importing unpredictable efficiencies and operating factors in such use. Because of the fact that the system herein does not involve the use of water or steam as motive fluids, appreciable overall savings in equipment and installation and maintenance costs for the same are made possible.

Various modifications will occur to those skilled in the art in the composition, configuration and disposition of the component elements going to make up the invention as a whole as well as in the selection and combination of particular features for specific purposes, and no limitation is intended by the phraseology in the foregoing description of illustrations in the accompanying drawings except as indicated in the appended claims.

What is claimed is:

1. A generating electric locomotive, comprising a generator assembly and driving motors electrically coupled to the generators, a gas turbine coupled to and driving the generator assembly, means for generating motive fluid for the gas turbine comprising a combustor, a fuel line feeding a pressurized streaming entrainment of pulverized solid particles to the combustor, means for pulverizing solid particles of fuel, means for feeding crushed solids to the fuel line including a storage chamber and a high pressure air pickup line connecting the chamber and the fuel line; crusher means feeding crushed solids to the storage chamber, storage means for the solid fuel to be crushed comprising at least one closed bunker in the locomotive, and closure means for the bunker.

2. In a coal-fired, gas turbine-powered, generating electric locomotive incorporating a coal fired gas turbine power plant using pulverulent solid fuel, and having at least one coal bunker for uncrushed bunker coal, a crushing mill, a storage chamber for crushed coal, a pulverizer, a combustion chamber, a gas turbine, and air compressors and electric generators driven by the turbine, the improvements comprising at least one closed bunker for crushed fuel, operating cabs at each end of the locomotive, and dual motive units severally comprising a crushed coal storage chamber, a combustion chamber, air compressors, generators and gas turbines, the static load of said bunker and of said motive units being balanced and uniformly distributed with respect to the central longitudinal axis of the locomotive.

3. A generating electric locomotive, comprising a generator assembly and driving motors electrically coupled to the generators, a gas turbine coupled to and driving the generator assembly, means for generating motive fluid for the gas turbine comprising a combustor, a fuel line feeding a pressurized streaming entrainment of pulverized solid particles to the combustor, means for pulverizing solid particles of fuel including a pneumatic pulverizer and classifier in the fuel line, means for feeding crushed solids to the fuel line including a storage chamber and a high pressure air pickup line connecting the chamber and the fuel line; crusher means feeding crushed solids to the storage chamber, storage means for the solid fuel to be crushed comprising at least one closed bunker in the locomotive, and closure means for the bunker comprising mating hinged doors in the roof of the locomotive.

4. In a generating electric turbine locomotive including a gas turbine, a main low pressure air compressor and electric generators driven by the turbine, an auxiliary high pressure air pump, a combustor, a fluidized solid fuel supply for the combustor, means for feeding fluidized solid fuel in a stream of high pressure combustion air to the combustor, means for mixing low pressure air with the gaseous products of combustion to form a heated motive fluid, and means for delivering the heated motive fluid to the gas turbine, the improvements comprising an uncrushed solid fuel supply, means for reducing the solid fuel to coarse particle size, means for forming a streaming entrainment of solid particles in a high-pressure stream of air, and incorporating pulverizing means for converting said streaming entrainment of solid particles into a streaming entrainment of fluidized pulverulent solids in a low-pressure stream of air to form a combustible gaseous fluid, means for separating the fly-ash resulting from the combustion of said pulverulent solids from the heated motive fluid delivered to the turbine, and means for discharging said separated fly-ash from the locomotive.

5. Solid fuel supply according to claim 4, comprising at least one enclosed bunker in the locomotive, and means in the bunker for delivering bunker coal to the reducing means and simultaneously drying the coal.

6. Solid fuel supply according to claim 4, comprising at least one enclosed hopper bunker mounted centrally of the locomotive and having its static load distributed along the longitudinal center line of the locomotive.

7. Solid fuel supply according to claim 4, comprising enclosed hopper bunkers mounted at each end of the locomotive, each said bunker having its static load distributed along the longitudinal center line of the locomotive.

8. The combination with a coal-fired, gas turbine-powered generating electric locomotive having a closed fuel compartment for uncrushed fuel and generally co-extensive in cross-section with the locomotive, a hopper at the bottom of the said compartment and embodying a stoker trough mounting a screw feeder; an air motor for said screw; a comminuting mill at the discharge outlet of said screw; means for supplying heated air as motive power from the turbine exhaust for the said motor; said motor discharging heated air into said trough and comminuting mill whereby to dry the coal and transport the same.

9. In a coal-fired, gas turbine-powered, generating electric locomotive incorporating a coal-fired gas turbine power plant using pulverulent solid fuel, and having at least one coal bunker for uncrushed fuel, a comminuting mill, a storage chamber for comminuted coal, a pulverizer, a combustion chamber, a gas turbine and air compressors and electric generators driven by the turbine; the improvements comprising at least one centrally disposed bunker for uncrushed fuel, operating cabs at each end of the locomotive, the storage chamber, and dual motive units severally comprising a combustion chamber, air compressors, generators and gas turbine, and being aligned in the longitudinal axis of the locomotive, said aligned dual motive units being severally disposed on either side of the bunker.

10. In a coal-fired, gas turbine-powered, generating electric locomotive incorporating a coal-fired gas turbine power plant using pulverulent fuel, and having a coal bunker for uncrushed fuel, a comminuting mill, a storage chamber for comminuted coal, a pulverizer, a combustion chamber, a gas turbine and air compressors and electric generators driven by the turbine; the improvements comprising a closed bunker for uncrushed fuel at one end of the locomotive, operating cabs at each end of the locomotive, the storage chamber, combustion chamber, air compressors, generators and gas turbine forming a motive unit, and parallel dual motive units mounted centrally of the locomotive, and symmetrical to the longitudinal axis thereof.

11. In a coal-fired, gas turbine-powered, generating electric locomotive incorporating a coal-fired gas turbine power plant using pulverulent fuel, and having a coal bunker for uncrushed coal, a comminuting mill, a storage chamber for comminuted coal, a pulverizer, a combustion chamber, a gas turbine and air compressors and electric generators driven by the turbine, the improvements comprising closed bunkers for uncrushed coal at both ends of the locomotive, operating cabs at both ends of the locomotive, the storage chamber, combustion chamber, air compressors, generators and gas turbine being aligned and forming a motive unit mounted in the longitudinal axis of the locomotive.

12. In a coal-fired, gas turbine-powered, generating electric locomotive incorporating a coal-fired gas turbine power plant using pulverulent fuel, and having a coal bunker for uncrushed bunker coal, a comminuting mill, a storage chamber for comminuted coal, a pulverizer, a combustion chamber, a gas turbine and air compressors and electric generators driven by the turbine, the improvements comprising a bunker for uncrushed bunker coal at one end of the locomotive, dual motive units mounted side-by-side in the locomotive, parallel to the longitudinal axis of the locomotive, each said unit comprising an aligned storage chamber, combustion chamber, air compressors, generators and gas turbine.

JOHN I. YELLOTT.

REFERENCES CITED

The following references are of record in the file of this patent:

UNITED STATES PATENTS

| Number | Name | Date |
|---|---|---|
| 609,744 | Hennig | Aug. 23, 1898 |
| 1,723,957 | Stevenson | Aug. 6, 1929 |
| 2,184,845 | Noack | Dec. 26, 1939 |
| 2,274,395 | Badenhausen | Feb. 24, 1942 |
| 2,298,309 | Ray | Oct. 13, 1942 |
| 2,336,052 | Anderson et al. | Dec. 7, 1943 |

OTHER REFERENCES

The Oil Engine and Gas Turbine, July 1947 (pages 98, 99 and 100).